No. 797,534. PATENTED AUG. 15, 1905.
L. PORE.
TRUCK ATTACHMENT FOR PLOWS.
APPLICATION FILED MAY 11, 1904.

Inventor
Leander Pore.

Witnesses

By Victor J. Evans
Attorney

UNITED STATES PATENT OFFICE.

LEANDER PORE, OF IUKA, KANSAS.

TRUCK ATTACHMENT FOR PLOWS.

No. 797,534.            Specification of Letters Patent.            Patented Aug. 15, 1905.

Application filed May 11, 1904. Serial No. 207,456.

*To all whom it may concern:*

Be it known that I, LEANDER PORE, a citizen of the United States, residing at Iuka, in the county of Pratt and State of Kansas, have invented new and useful Improvements in Truck Attachments for Plows, of which the following is a specification.

This invention relates to riding attachments for the ordinary form of plows or those requiring the operator to walk behind the same; and the primary object of the attachment is to provide a simple and effective device for supporting the operator and moving behind the plow, the said device running in the furrow and attached in such manner that it will be permitted to conform readily to the movement of the plow and will be prevented from turning over or sluing and being thrown out of or at an angle to the furrow in turning curves or traveling an irregular furrow. The attachment is especially advantageous in practically holding the operator in sitting position and avoiding fatigue incident to long tramps or walks behind a plow without in the least detracting from the operation of the latter, the attachment being readily separable from and connectible to a plow.

The invention consists in the construction and arrangement of the details which will be more fully hereinafter set forth.

Figure 1:
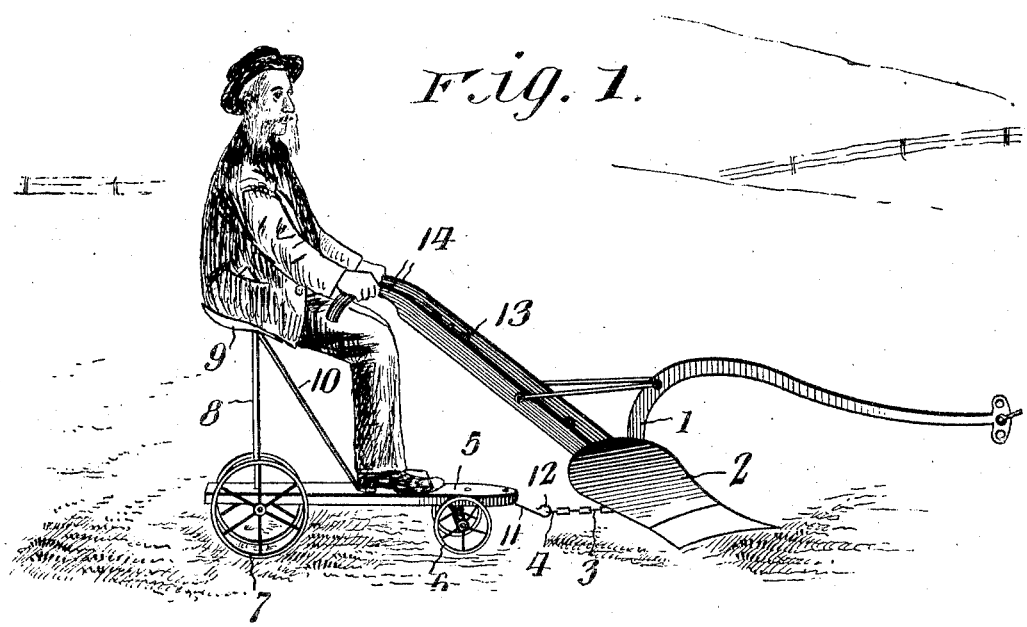
Figure 2:
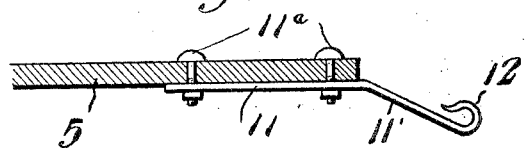

In the drawings, Figure 1 is a perspective view of a plow showing the attachment applied thereto. Fig. 2 is an enlarged horizontal section on the line 2 2, Fig. 1.

Similar numerals of reference are employed to indicate corresponding parts in both views.

The numeral 1 designates a plow of ordinary form or that commonly used by farmers and others and has a moldboard 2, and projecting rearwardly from between the moldboard and landside at a suitable elevation is a draft connection 3, in the form of a chain, having a terminal loop or coupling-eye 4. The attachment consists of a truck or small vehicle provided with a body or bed 5 and mounted on front and rear pairs of wheels 6 and 7, which have the usual axle and bolster devices, or the said wheels may be applied in any other manner. A particular application of the pairs of wheels is not essential to the operation of the truck, although the wheels of each pair must be placed close enough to run in the furrow formed by the plow. Rising from the rear portion of the body or bed 5 between the rear pair of wheels 7 is a seat upright or standard 8, having a seat 9 thereon, and secured to the standard is a brace 10, which extends downwardly and is attached to the center of the body in advance of the upright. To the front end of the body at the center a coupling-bar 11 is attached by suitable fastening devices $11^a$ and has a downwardly and forwardly inclined shank $11'$, terminating in a front hook 12, which is preferably upturned and separably connected to the loop 4.

The truck may be readily attached or disconnected from the draft connection 3, and the parts are so proportioned that when the coupling bar or device 11 is attached to the draft connection the plow-handles 13 will project upwardly over the forward extremity of the truck to position the grips 14 within convenient reaching distance of the seat 9. After the truck has been attached to the draft connection 3 the operator assumes a position on the truck similar to that shown by Fig. 1, and as the plow is drawn forward the truck follows in the furrow, the operator being permitted to have free use of his hands in manipulating the plow as may be necessary.

As the plow is drawn forward the truck conforms to unevenness of the ground over which it moves and to the lateral play of the plow through the medium of the connection between the coupling bar or device 11 and the draft connection 3. It will be observed that the chain 3 and hook 12 form a swiveled draft connection, which permits free movement of the truck in all directions, thus not only allowing the truck and plow to have independent lateral play, but also vertical play, whereby the plow may be manipulated by the operator without interference from the truck or riding attachment. Also it will be observed that by having the shank $11'$ of the coupling 11 downwardly and forwardly inclined the draft connection between the plow and truck is disposed mainly below the plane of the truck-body, whereby a forward and downward pull is exerted upon the rear portion of the truck to maintain the same and the front pair of wheels 6 in the furrow. This action is supplemented by arranging the seat-supporting standard 8 vertically immediately above the rear wheels 7, so that the greater portion of the weight of the operator will be sustained by the rear portion of the truck. By thus so connecting the draft attachment that the pull of the plow holds the forward end of the truck and the weight of the operator holds the rear end of the truck downward the truck is prevented from tilting under variations in the position of the plow when adjusted to penetrate the soil to a greater or less extent and from sluing or being laterally deflected and thrown across or out of the furrow in the turning of corners or when the truck is running in an irregular furrow. The disposition of the seat-supporting standard and seat further enables the operator to occupy the most effective position for balancing the truck and controlling the plow through the stilts or handles 14.

The improved attachment will be found exceptionally convenient and useful and will overcome materially the tiresome movement and fatigue of operators or plowmen incident to the usual methods of plowing.

The attachment can be manufactured and placed on the market at a comparatively small cost and may be applied to plows now in use by providing the latter with the draft connection 3. The application of the draft connection 3 to plows now in use may be readily accomplished at a small cost. It will also be understood that the proportions and general dimensions of the truck may be modified to adapt the same for use in connection with different sizes of plows.

Having thus described the invention, what is claimed as new is—

An attachment for plows comprising a four-wheeled truck having a one-part platform provided with a vertical standard secured thereto and between the rear wheels thereof, and having a seat thereon, an inclined brace having one end secured to the truck its opposite end secured to the standard, a coupling-bar having a straight portion secured to the under side of the front end of the platform, the bar having a downwardly and forwardly inclined extension provided with a terminal hook end, a chain having an eye detachably connected to the hook at one end, the opposite end of the chain being secured to the plow in line with the hook, said chain serving to permit of lateral and vertical movement of the truck during the operation of the same, and the handles of the plow being arranged over and above the central portion of the platform of the truck and in line with the seat when the truck is attached to the plow, substantially as specified.

In testimony whereof I affix my signature in presence of two witnesses.

LEANDER PORE.

Witnesses:
O. H. BOCK,
J. K. HUPP.